Feb. 12, 1924.
A. H. CHURCHILL
1,483,781
MOUNTING FOR FALSE TEETH
Filed Jan. 31, 1920    3 Sheets-Sheet 1
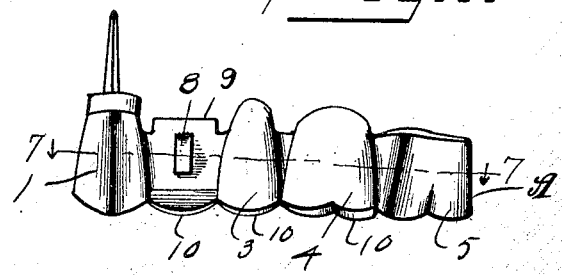
Fig. 1.
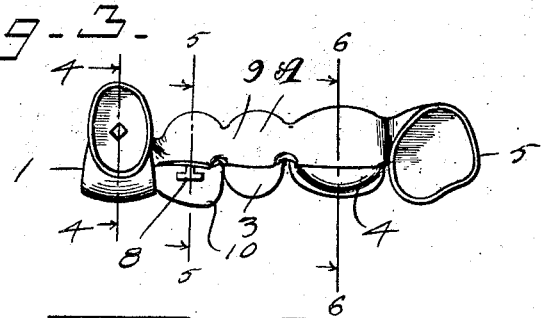
Fig. 3.
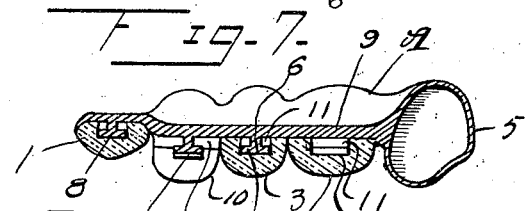
Fig. 7.
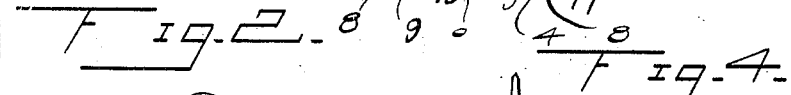
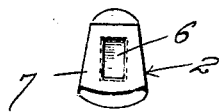
Fig. 2.
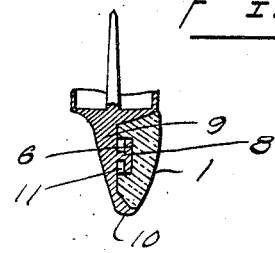
Fig. 4.
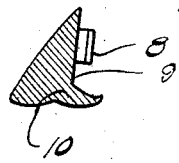
Fig. 5.
Inventor
A. H. Churchill
By A. Randolph Jr. Atty Feb. 12, 1924.

A. H. CHURCHILL

MOUNTING FOR FALSE TEETH

Filed Jan. 31, 1920      3 Sheets-Sheet 2

Inventor
A. H. Churchill

By
Atty

Feb. 12, 1924.
A. H. CHURCHILL
1,483,781
MOUNTING FOR FALSE TEETH
Filed Jan. 31, 1920    3 Sheets-Sheet 3
Fig. 14.
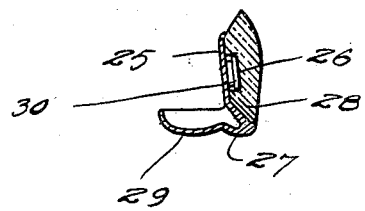
Fig. 15.    Fig. 16.
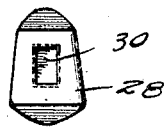    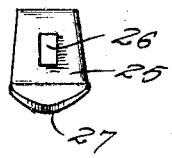
Fig. 17.
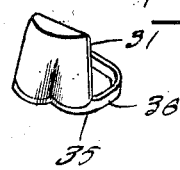
Fig. 18.    Fig. 19.
    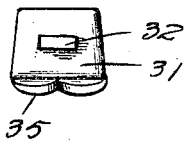
Fig. 20.
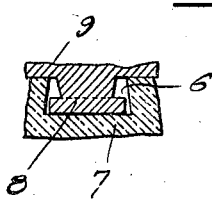
Inventor
A. H. Churchill
By A. H. Randolph Jr. Atty Patented Feb. 12, 1924.

1,483,781

UNITED STATES PATENT OFFICE.

ARTHUR H. CHURCHILL, OF YARMOUTH, NOVA SCOTIA, CANADA.

MOUNTING FOR FALSE TEETH.

Application filed January 31, 1920. Serial No. 355,470.

*To all whom it may concern:*

Be it known that I, ARTHUR H. CHURCHILL, a subject of the King of Great Britain, residing at Yarmouth, in the Province of Nova Scotia and Dominion of Canada, have invented certain new and useful Improvements in Mountings for False Teeth; and I do hereby declare the following to be a full, clear, and exact description of the invention, such as will enable others skilled in the art to which it appertains to make and use the same.

This invention relates to certain new and useful improvements in a mounting for false teeth and has for its primary object the provision of a form of mounting including a combination of locking features and a protecting cusp or tip for protecting the grinding surface of the tooth and which features may be incorporated in various forms of mountings.

Another object of the invention resides in the provision of a form of mounting for false teeth which will securely hold the various teeth in position and relieve the same of unnecessary strain and wear.

A further object of the invention resides in the provision of a false tooth mounting of the above stated character including a tenon carried by the backing and tip to be cemented in a mortise in the porcelain or other facing of the false tooth.

A further object of the invention resides in the provision of the false teeth mounting including the securing means for the porcelain facing and the protecting means for the grinding or biting edge of the false teeth constructed and arranged in such manner that the feature may be incorporated in the structure in each tooth of bridge work supporting either anterior teeth or posterior teeth.

A further object of this invention resides in the provision of a mounting for false teeth in which a rigid supporting bridge may be provided for the interchangeable teeth and the various parts are secured together so that the teeth will not be weakened although they may be readily fitted or replaced and when in position the strain will be taken off of the porcelain and the latter protected from strain when occluding with the opposite teeth.

A still further object of the invention resides in the provision of false tooth mounting of the above stated character in which the manner of the engaging of the porcelain facing with the backing and its tip or cusp, as the case may be, makes this style of tooth simple and easy to manipulate.

Other objects of the invention will appear as the description proceeds and it will be understood that the invention consists in the combination, arrangement and cooperation of elements as hereinafter more specifically set forth, claimed and shown in the accompanying drawings forming a part of this application and in which:—

Figure 1 is a front elevation of a posterior bridge complete, ready for cementing to abutments, showing a cuspid Richmond crown and a gold shell crown for abutments, with two bi-cuspid facings and a molar facing, one of the bi-cuspid facings being removed.

Figure 2 is a detail rear elevation of the bi-cuspid facings removed from the bridge structure shown in Figure 1.

Figure 3 is a plan view of the bridge structure as shown in Figure 1.

Figure 4 is a detail vertical transverse section on the plane of line 4—4 of Figure 3.

Figure 5 is a similar view on the plane of line 5—5 of Figure 3.

Figure 8 is a perspective view of an anterior bridge complete with three facings, two of which have been removed.

Figure 14 shows the mounting of a bi-cuspid.

Figure 15 is a detail of the porcelain facing removed.

Figure 16 is a detail of the backing shown in Figure 14 and carrying the tenon and cusp.

Figure 17 is a perspective view of a molar mounting.

Figure 18 is a detail view of the porcelain facing of the structure shown in Figure 17, removed.

Figure 19 is a detail view of the backing shown in Figure 17 and carrying the tenon and cusp.

Figure 20 is an enlarged detail section showing the mortise and tenon connection between the backing and facing of one of the teeth.

Figure 6:
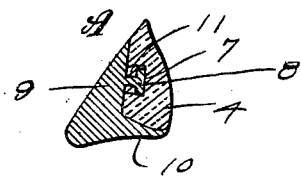
Figure 6 is a similar view of the plane of line 6—6 of Figure 3.
Figure 7:
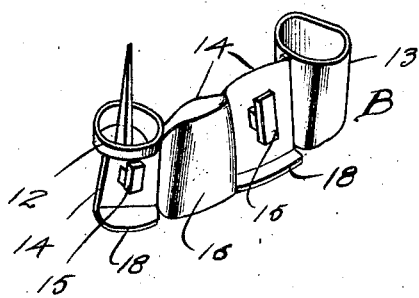
Figure 7 is a detail longitudinal section on the plane of line 7—7 of Figure 1.
Figure 9:
Figures 9 and 10 are detail views of the two facings removed from the bridge structure shown in Figure 8.
Figure 10:

Referring more in detail to the drawings, in which similar reference characters designate corresponding parts throughout the several views, the letter A designates a posterior bridge, which is shown clearly in Figures 1 and 3 and which includes four false teeth and a crown, as will be seen by referring to the drawings, the first tooth, designated by the numeral 1, being a cuspid Richmond crown, the next two teeth, designated by the numerals 2 and 3, being bicuspids, the next, designated by the numeral 4, being a molar, next to which is formed the shell crown 5. Each of the teeth 1, 2, 3 and 4 has a dovetailed mortise 6 formed in the inner or rear side of the porcelain facing 7 to receive a dovetailed tenon 8 projecting from the receiving side of the backing 9 provided for the porcelain facing 7. Formed with each back 9 is a cusp 10 which extends around and completely covers the grinding surface of the porcelain facing of the false tooth to protect the same and also cooperate with the tenon 8 and securely holding the facing 7 in rigid position and relieving the facing 7 of stress and protecting the same from strain when the false teeth are occluding with the opposite teeth in the wearer's mouth. The cuspid and bicuspids have their facings 7 secured upon the backings 9 by vertical elongated tenons 8 while the molar facing 7 is retained in position upon the backing 9 provided for the same by means of a horizontal elongated tenon 8, as will be clear from the sectional views through these teeth and the posterior bridge. It is also understood that the facings 7 are cemented in position, as indicated by the numeral 11 and the bridge, constructed of gold or some other suitable material, is moulded into proper shape to form all of the backings, crowns and cusps in one piece.

The anterior bridge B, shown clearly in Figure 8, includes a Richmond crown 12, a gold shell crown 13 and two backings 14 carrying tenons 15 to receive porcelain facings 16 of anterior or incisor teeth, the porcelain facings 16 having dovetailed mortises 17 formed therein and within which may be cemented the dovetailed tenons 15. The Richmond crown 12 of this bridge also has a tenon 15 formed on the backing 14 thereof for engagement in the mortise 17 of the porcelain facing 16 for engagement on its backing. Each backing 14 of this bridge also carries a tip 18 which extends around the biting edge of the facing secured upon the backing which is also formed as a part of the bridge and for the same purpose. All of the tenons 15 in its second form of bridge are elongated vertically and the mortises to receive the same formed correspondingly in the porcelain facings. All of the facings of this bridge are to be cemented in position, as customary in dental work.

Figure 11:
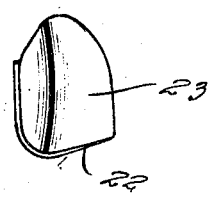
Figure 11 is a perspective view of a porcelain facing (for anterior) incisor mounted on the gold backing provided for the same.
Figure 13:
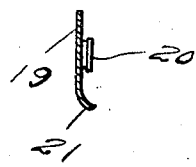
Figure 13 is a detail of the backing employed for the facing shown in Figure 12.
Figure 12:
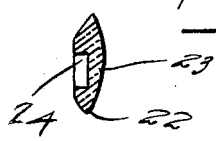
Figure 12 is a detail of the facing removed.

By referring to Figures 11 to 13 inclusive, the application of this invention to an (anterior) incisor tooth may be readily understood, the gold backing 19 carrying the vertical elongated dovetailed tenon 20 upon its front or outer side and having formed on its lower face the tip 21 for engagement over the biting edge 22 of the porcelain facing 23, which latter has a dovetailed mortise 24 formed in its rear side to receive the tenon 20 as the porcelain facing 23 is cemented upon the backing 19.

In Figures 14 to 16 inclusive, the application of the invention to a bi-cuspid is disclosed. As shown, the gold backing 25 carries the vertically elongated tenon 26 upon its front side and has its lower edge turned and formed for engagement over the grinding surface of the porcelain facing 28, its portion of the backing 25 serving as a cusp 27 to protect the grinding surface of the facing 28, a complete grinding face 29 being also formed with the backing 25 in this case. The bi-cuspid facing 28 is provided with a vertically elongated mortise 30 to receive the tenon 26 as the facing 28 is cemented in position.

In Figures 17 to 19 inclusive, I have shown the application of the invention to a molar tooth, in which the backing 31 has a transversely elongated tenon 32 formed on its front side for engagement in a correspondingly formed mortise 33 in the rear side of the porcelain facing 24 as the latter is cemented in position upon the backing 31. This backing 31 includes a properly shaped extending edge portion to provide a cusp 35 for engagement over the grinding surface of the porcelain facing 34. In this mounting the cusp 35 forms practically a continuation of the grinding face 36 carried by the backing 31.

By a careful study of the foregoing in connection with the accompanying drawings, it will be apparent that the same principle of the cooperating tenon and mortise connections between the backing and facing and the cusp surrounding and protecting the biting or grinding edge of the facing and assisting in retaining the latter in proper position and relieving the same of stress or strain when the false tooth is occluding with the opposite tooth in the wearer's mouth may be applied to various forms of mountings for false teeth either when mounting single teeth or when including several false teeth on a bridge.

While various forms or applications of the principle involved in this invention have been disclosed herein, it will be understood that I do not desire to limit myself to the details shown and described, as various improvements may be resorted to within the scope of what is claimed without departing from the spirit of the invention.

What is claimed is:—

1. A false tooth mounting consisting of a backing, a facing having its masticating edge in contact with the backing for reinforcement thereby, a tenon on the backing above and out of contact with said edge, said facing being applicable to the backing and the tenon to the facing by movement substantially laterally of the backing to enable removal and replacement of the facing whereby bending of the backing for insertion or removal of the facing is avoided to enable the backing to be reinforced at its masticating edge, said facing having a mortise to receive said tenon, and the facing being unbroken about said mortise to avoid undue weakening of the facing particularly at said masticating edge.

2. A false tooth mounting having a backing provided with a rearwardly extending cusp, a portion extending upwardly and inwardly from the cusp and being out of contact with the cusp at the rear of the portion, an upstanding portion rising from the inner extremity of the first portion, the upstanding portion being substantially in a plane passing through the cusp at a distance from the front edge thereof, a facing applicable against the upstanding portion by lateral movement and having its lower edge in intimate contact with the upper surface of the first portion, a securing tenon on the upstanding portion, the facing having a mortise adapted to be entered by the facing through said movement, and the facing being substantially unbroken about the mortise.

In testimony whereof I affix my signature in presence of two witnesses.

ARTHUR H. CHURCHILL.

Witnesses:
 G. W. SAULNIER,
 BEL W. TREFRY.